(12) United States Patent
Kizaki et al.

(10) Patent No.: US 8,841,543 B2
(45) Date of Patent: Sep. 23, 2014

(54) PHOTOELECTRIC CONVERSION ELEMENT

(75) Inventors: Takeshi Kizaki, Sakura (JP); Nobuo Tanabe, Sakura (JP); Takayuki Kitamura, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/960,228

(22) Filed: Dec. 3, 2010

(65) Prior Publication Data

US 2011/0073170 A1    Mar. 31, 2011

Related U.S. Application Data

(63) Continuation of application No. PCT/JP2009/060468, filed on Jun. 8, 2009.

(30) Foreign Application Priority Data

Jun. 6, 2008   (JP) .................................. 2008-149922

(51) Int. Cl.
*H01L 31/00* (2006.01)
*H01G 9/20* (2006.01)

(52) U.S. Cl.
CPC ........... *H01G 9/2027* (2013.01); *H01G 9/2059* (2013.01); *H01G 9/2068* (2013.01); *Y02E 10/542* (2013.01)
USPC ........... 136/252; 136/255; 136/256; 136/263; 136/265

(58) Field of Classification Search
CPC . H01G 9/2027; H01G 9/2068; H01G 9/2059; Y02E 10/542
USPC ............................. 136/252, 255, 256, 263, 265
See application file for complete search history.

(56) References Cited

U.S. PATENT DOCUMENTS

| 4,348,546 A * | 9/1982 | Little ........................... 136/256 |
| 6,194,650 B1 | 2/2001 | Wakayama et al. |
| 6,515,218 B1 * | 2/2003 | Shimizu et al. ............. 136/256 |
| 2005/0072458 A1 * | 4/2005 | Goldstein ..................... 136/251 |
| 2007/0116640 A1 | 5/2007 | Kim et al. |
| 2007/0251574 A1 * | 11/2007 | Fujimaki et al. ............. 136/263 |

FOREIGN PATENT DOCUMENTS

| JP | 01-220380 A | 9/1989 |
| JP | 2000-021460 A | 1/2000 |
| JP | 2001-283941 A | 10/2001 |
| JP | 2001-283945 A | 10/2001 |
| JP | 2005-142085 A | 6/2005 |
| JP | 2005-285473 A | 10/2005 |
| JP | 2007-009398 A | 1/2007 |

OTHER PUBLICATIONS

English machine translation of JP 2001-283945 A.*
Brian O'Regan, et al., "A Low-Cost, High-Efficiency Solar Cell Based on Dye-Sensitized Colloidal $TiO_2$ Films", Letter to Nature, Oct. 24, 1991, pp. 737-739, vol. 353.

* cited by examiner

*Primary Examiner* — Jonathan Johnson
*Assistant Examiner* — Lindsey Bernier
(74) *Attorney, Agent, or Firm* — Sughrue Mion, PLLC

(57) ABSTRACT

A photoelectric conversion element of the present invention includes: a first electrode being linear; a second electrode; and an electrolyte. The first electrode and the second electrode are disposed via the electrolyte. The first electrode includes a first linear material which includes a copper wire and a metal coating which coats the copper wire and a dye-carrying porous oxide semiconductor layer disposed on an outer circumference of the first linear material.

2 Claims, 6 Drawing Sheets

PHOTOELECTRIC CONVERSION ELEMENT

CROSS-REFERENCE TO RELATED APPLICATION

This is a Continuation Application of International Application No. PCT/JP2009/060468, filed on Jun. 8, 2009, which claims priority to Japanese Patent Application No. 2008-149922, filed Jun. 6, 2008. The contents of the aforementioned applications are incorporated herein by reference.

TECHNICAL FIELD

The present invention relates to a photoelectric conversion element that can be applied to a dye-sensitized solar cell or the like.

BACKGROUND ART

A dye-sensitized solar cell has been proposed by Michael Graetzel, Switzerland, et al., and has received considerable attention as a high-conversion efficiency and low-cost photoelectric conversion element (see, for example, patent document 1 and non-patent document 1).

FIG. 7 illustrates an exemplary related art dye-sensitized solar cell in a cross-sectional view.

A dye-sensitized solar cell 100 mainly includes a first substrate 101, a second substrate 105 and an electrolyte 106. The first substrate 101 includes, on a surface thereof, a sensitizing dye-carrying porous semiconductor electrode (hereinafter, referred to as "dye-sensitized semiconductor electrode") 103. The second substrate 105 includes, on a surface thereof, a conductive film 104. The electrolyte 106 includes an oxidation-reduction couple (redox pair), such as iodine and iodide ion, and is sealed between the first and second substrates 103 and 105.

The first substrate 101 uses a light-transmitting plate material. The first substrate 101 includes, on a surface in contact with the dye-sensitized semiconductor electrode 103, a transparent conductive layer 102 which imparts conductivity. The first substrate 101, the transparent conductive layer 102 and the dye-sensitized semiconductor electrode 103 altogether constitute a working electrode (i.e., a window electrode) 108.

The second substrate 105 includes, on a surface in contact with the electrolyte 106, a conductive film 104 comprising, for example, of carbon or platinum, which imparts conductivity. The second substrate 105 and the conductive film 104 altogether constitute a counter electrode 109.

In the dye-sensitized solar cell 100, the first substrate 101 and the second substrate 105 are positioned at a predetermined distance from each other with the dye-sensitized semiconductor electrode 103 and the conductive film 104 opposing each other. A sealant 107, which may be thermoplastic resin, is provided between, and at the periphery of, these substrates. The first substrate 101 and the second substrate 105 are bonded together with the sealant 107 to provide a stacked cell. A space between the electrodes 108 and 109 is filled with an organic electrolyte containing the oxidation-reduction couple, such as iodine and iodide ion, introduced via an electrolyte inlet 110 to provide a charge transfer electrolyte 106.

The dye-sensitized solar cell 100 should possess visible light transmittance and high conductivity especially at the light-incident electrode thereof (i.e., the window electrode 108). The window electrode 108 has therefore been a conductive substrate that includes a transparent conductive metal oxide, such as indium tin oxide (ITO) or fluorine-doped tin oxide (FTO), applied onto the first substrate 101 (e.g., a glass substrate or a plastic substrate).

However, the substances used in the conductive substrate, such as indium (In), are rare metal which are becoming increasingly expensive and thus are preventing cost reduction of the photoelectric conversion element. It is therefore desired, from the viewpoint of significant reduction in cost, to develop a dye-sensitized photoelectric conversion element that eliminates the need of a conductive substrate and requires a reduced amount of rare metal while keeping the light-receiving efficiency.

REFERENCE

Patent Document

[Patent document 1] Japanese Unexamined Patent Application, First Publication No. H01-220380

Non-Patent Document

[Non-patent document 1] Michael Graetzel et al., Nature, United Kingdom, 1991, vol. 737, p. 353

SUMMARY

Problem to be Solved by The Invention

The invention has been made in view of the above circumstances, and an object thereof is to provide a novel low-cost photoelectric conversion element that requires no conductive substrate and is excellent in light-receiving efficiency.

Means for Solving the Problems (1) A first aspect of the invention is a photoelectric conversion element which includes: a first electrode being linear; a second electrode; and an electrolyte. The first electrode and the second electrode are disposed via the electrolyte. The first electrode includes a first linear material which includes a copper wire and a metal coating which coats the copper wire and a dye-carrying porous oxide semiconductor layer disposed on an outer circumference of the first linear material.

According to the photoelectric conversion element disclosed in (1) above, no conductive substrate is necessary and thus cost is reduced. The central metal is a copper wire with a metal coating. Such a central metal, as compared to a single metal wire, has greater corrosion resistance, higher conductivity of the conductive line and lower cost. Since the outer circumferential surface of the linear first electrode serves as a light-receiving surface, a project area to the incoming light may be increased and thus dependence to the light incidence angle may be decreased.

(2) The metal coating may comprise a metal selected from a group comprising of titanium, nickel, tungsten, rhodium and molybdenum.

(3) The amount of voltage drop of the first linear material may be 300 mV or less. In the case of (3) above, power generation efficiency of the photoelectric conversion element may be improved.

(4) The copper wire may be coated with the metal coating at a surface ratio of the copper wire to the metal coating such that the amount of voltage drop is 300 mV or less.

In the case of (4) above, the surface of the copper wire may be kept uniform and oxidization of the copper wire may be prevented while enhancing the power generation efficiency of the photoelectric conversion element.

(5) The thickness of the metal coating may be 2 μm or greater.

In the case of (5) above, formation of pinholes in the metal coating may be prevented. Therefore, composition change in the electrolyte caused by reaction of the copper wire and the electrolyte of the photoelectric conversion element may be prevented. As a result, photoelectric conversion efficiency of the photoelectric conversion element may be impaired.

(6) The second electrode may be a linear electrode and the first electrode and the second electrode are disposed alternately.

In the case of (6) above, a linear photoelectric conversion element may be obtained, which may be readily disposed at various locations.

Effect Of The Invention

The photoelectric conversion element of the first aspect of the invention includes the first electrode which includes a conductive first linear material and a dye-carrying porous oxide semiconductor layer provided to surround the first linear material. With this configuration, the photoelectric conversion element of the first aspect of the invention has a completely novel structure in which no conductive substrate is necessary and thus cost is reduced. Since the outer circumferential surface of the linear first electrode serves as a light-receiving surface, a project area to the incoming light may be increased and thus dependence to the light incidence angle may be decreased.

The first linear material may employ a copper wire as the central metal, which may be surrounded by, for example, titanium or the like. Such a first linear material has greater corrosion resistance, higher conductivity of the first linear material and lower cost as compared to a single metal wire selected from, for example, titanium (Ti), nickel (Ni), tungsten (W), rhodium (Rh) and molybdenum (Mo).

BEST MODES FOR CARRYING OUT THE INVENTION

<First Embodiment>

Figure 1:
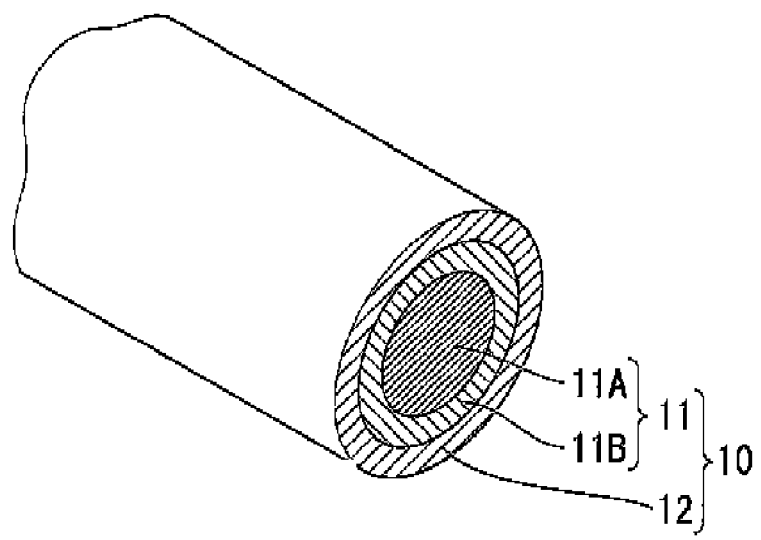
FIG. 1 is a cross-sectional perspective view of an electrode (first electrode) of a photoelectric conversion element according to an embodiment of the invention.

Referring now to the drawings, embodiments of the invention will be described.

Figure 3:
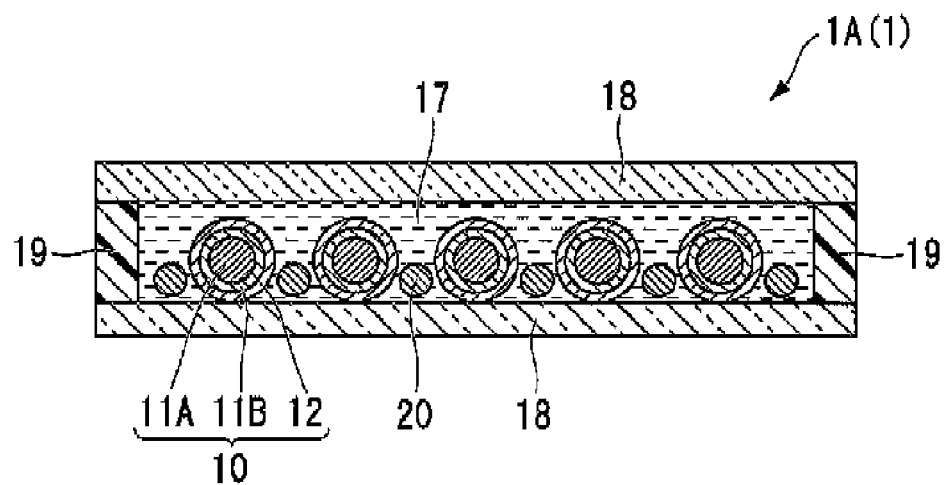
FIG. 3 is a cross-sectional view of an exemplary photoelectric conversion element according to an embodiment of the invention.
Figure 4:
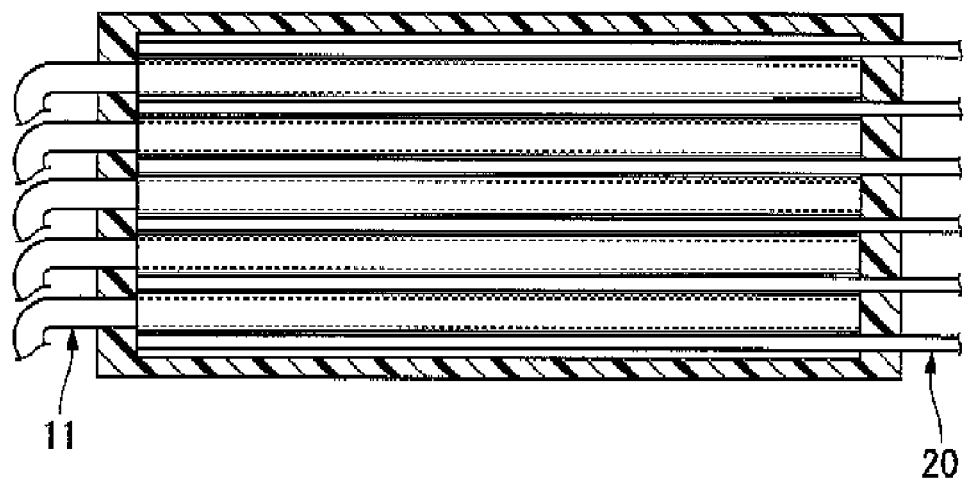
FIG. 4 is a top view of the photoelectric conversion element shown in FIG. 3.

FIG. 1 illustrates an exemplary electrode (i.e., a first electrode) incorporated in a photoelectric conversion element according to an embodiment of the invention shown in a cross-sectional view. FIG. 3 illustrates an exemplary photoelectric conversion element of the present embodiment shown in a cross-sectional view. FIG. 4 is a top view of the photoelectric conversion element shown in FIG. 3.

As shown in FIG. 3, a photoelectric conversion element 1A (1) according to the present embodiment includes linear first electrodes 10, linear second electrodes 20, an electrolyte 17, a pair of transparent substrates 18 and a spacer 19. The spacer 19 is disposed at a periphery of the pair of transparent substrates 18. The first electrodes 10 and the second electrodes 20 are alternately arranged on a surface of one of the pair of transparent substrates 18 via the electrolyte 17. The first electrodes 10, the second electrodes 20 and the electrolyte 17 are sealed by the pair of transparent substrates 18 and the spacer 19.

As illustrated in FIGS. 1 and 3, each of the first electrodes 10 includes a first linear material 11 and a sensitizing dye-carrying porous oxide semiconductor layer 12. The first linear material 11 includes a copper wire 11A and a metal coating 11B (e.g., titanium or the like) which covers the copper wire 11A. The porous oxide semiconductor layer 12 is disposed at an outer circumference of the copper wire 11A.

A first electrode (i.e., a working electrode) of a related art photoelectric conversion element includes a transparent conductive substrate fabricated by forming a transparent conductive film, such as FTO and ITO, on a transparent substrate, such as a glass substrate or a plastic substrate. It has therefore been difficult to fabricate a porous oxide semiconductor layer by sintering the transparent substrate at a temperature of about 600° C. or higher for a glass substrate and 150° C. or higher for a plastic substrate from the viewpoint of heat-resistance of the transparent substrate.

The first electrode 10 according to the present embodiment, however, employs metal wire as the first linear material 11 to address the sintering temperature problem and thus may be sufficiently sintered at high temperatures. Accordingly, the first electrode 10 is suitable as the electrode (i.e., the working electrode) for photoelectric conversion elements.

Since the first electrode 10 of the present embodiment is made of a linear material instead of a substrate, the first electrode 10 has flexibility and thus may be employed as electrodes in various photoelectric conversion elements.

Since no glass substrate or transparent conductive film is used as in the related art electrodes, the first electrode 10 may be fabricated at low cost.

The first material 11 is a linear member which includes a copper wire 11A and a metal coating 11B which surrounds the copper wire 11A.

In order to keep the surface of the central metal (i.e., the copper wire 11A) uniform and to improve an antioxidizing effect, the metal coating 11B may preferably be Ti or the like which is electrochemically inert with respect to the electrolyte. The metal coating 11B may also be Ni, W, Rh and Mo as well as Ti, and alloys thereof.

The copper wire 11A may preferably be made of pure copper.

It is preferred that the metal coating 11B be as thin as possible. However, if the metal coating 11B is excessively thin, the likelihood of formation of pinholes or the like in the metal coating 11B during stretching of the first material 11 increases. Pinholes existing in the metal coating 11B may cause the copper wire 11A (copper) inside of the metal coating 11B and the electrolyte of the photoelectric conversion element to react together which may result in change in the electrolyte composition. As a result, photoelectric conversion efficiency of the photoelectric conversion element may be impaired.

If the metal coating 11B is thick, on the other hand, the likelihood of formation of pinholes during fabrication of the first material decreases. However, the thicker metal coating 11B may require a larger amount of, for example, expensive Ti or the like, which may increase the cost. Since the metal coating 11B exhibits lower conductivity than that of the copper wire 11A, the thicker metal coating 11B may reduce conductivity of the photoelectric conversion element. As a result, the photoelectric conversion efficiency will be impaired.

Accordingly, the metal coating 11B is preferably as thin as possible so long as no pinhole is formed during stretching of the wire. The following experiments are conducted to determine the optimal thickness of the metal coating 11B.

First linear materials 11 each having a wire diameter of φ0.05 mm, φ0.2 mm or φ0.5 mm are fabricated using Ti as the metal coating 11B. The thickness of the Ti layer of each of the first linear materials 11 for each wire diameter is 0.5 μm, 1.0 μm, 1.5 μm, 2.0 μm and 3.0 μm.

Each of the first linear materials 11 is wound onto a bobbin and immersed in concentrated nitric acid for 24 hours. Then, the bobbin is removed from the concentrated nitric acid, washed and dried. Each of the first linear materials 11 is then unwound under constant tension (i.e., load equivalent to one half of breaking tension of a sound area of the first linear material 11). The first linear material 11 is broken at areas where pinholes exist in the Ti layer since the copper inside the first linear material 11 (i.e., the copper wire 11A) is corroded by the nitric acid. As a result, the breaking tension is impaired and the first linear material 11 is broken. In this manner, formation of the pinholes in the metal coating 11B may be recognized by recording breaking frequency during unwinding the first linear material 11. The result is shown in Table 1.

TABLE 1

| Thickness of metal coating | Wire diameter (mm) | | | |
|---|---|---|---|---|
| (μm) | 0.05 | 0.10 | 0.20 | 0.50 |
| 0.5 | 45 | 38 | 32 | 26 |
| 1.0 | 18 | 11 | 7 | 4 |
| 1.5 | 4 | 0 | 0 | 0 |
| 2.0 | 0 | 0 | 0 | 0 |
| 3.0 | 0 | 0 | 0 | 0 |

Table 1 shows that the frequency of pinhole depends largely on the thickness of the Ti layer (metal coating 11B). No pinhole is formed in the Ti layer having thickness of 2 μm or greater. When comparing two the first linear materials having Ti layers of the same thickness, pinholes are formed more frequently in the one with narrower diameter. This is because, since the thickness of the Ti layer may vary in the longitudinal direction of the first linear material 11, during stretching the wire, the narrower first linear material 11, which is to be more highly processed (i.e., be susceptible to the load), may have increased frequency of pinhole in the longitudinal direction thereof.

Accordingly, the thickness of the Ti layer (i.e., the metal coating 11B) is preferably 2 μm or greater for the first linear material 11 to be incorporated in the photoelectric conversion element. This may be applied to the metal coating 11B of other metal (Ni, W, Rh or Mo).

In the photoelectric conversion element, the voltage drops if the current generated by the photoelectric conversion element meets high resistance until it reaches the current collecting section, and thus voltage reduction generated. Accordingly, the power generation efficiency of the photoelectric conversion element may deteriorate.

In the first linear material 11 in which the copper wire 11A is coated with the metal coating 11B, such as titanium, the current generated by the porous oxide semiconductor layer 12 of $TiO_2$ or other material sintered to the first linear material 11 travels through the first linear material 11 and reaches the current collecting section. Accordingly, the voltage drop may be controlled by the first linear material 11 with lower resistance so as to improve the performance of the solar cell. Generally, the voltage drop herein is preferably 300 mV or less from a practical viewpoint.

Here, a relationship between resistance and various factors contributing to the photoelectric conversion efficiency will be described.

(i) The first linear material 11 which is small in diameter may have higher resistance. The first linear material 11 of smaller diameter may have smaller light-receiving surface area in the first electrode 10, which may reduce the absolute amount of the current to be generated.

(ii) The first linear material 11 which is short in length may have lower resistance and is thus preferable.

(iii) A surface area of the metal coating 11B, such as titanium, should be reduced due to higher resistance of titanium as compared to that of copper.

Figure 2:
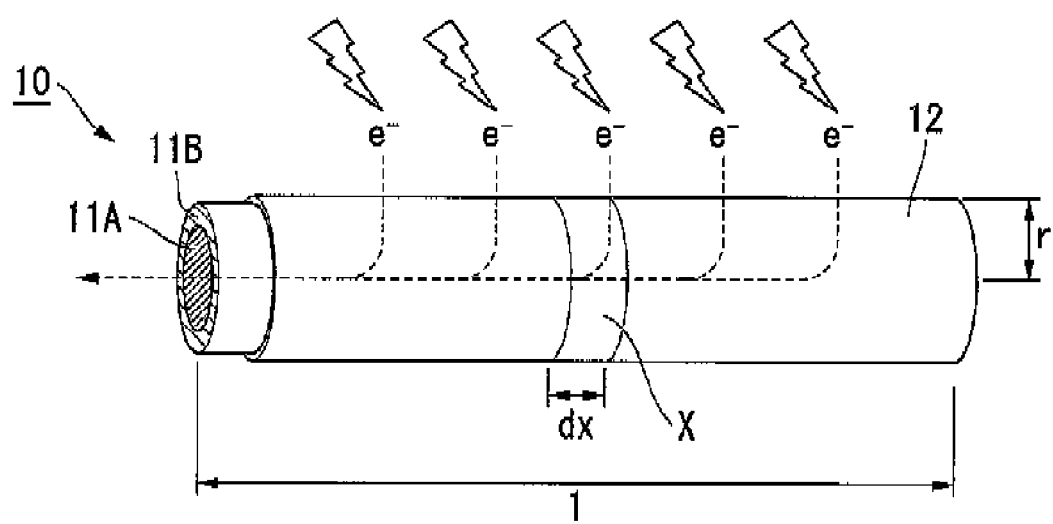
FIG. 2 schematically illustrates the first electrode with its upper half irradiated with light.

As described above, the amount of the voltage drop depends on the wire diameter, length, conductivity and generated current density of the first linear material 11. For example, as shown in FIG. 2, consider that a first electrode 10 with its upper half irradiated with light generates electric power. In FIG. 2, r represents the radius of the first linear material 11, l represents the length of the first linear material 11 and dx represents the width at a point x of the first linear material 11. In this case, the current amount I(x) generated at the width dx is represented by the following equation (1).

$$I(x) = \frac{J_{SC} \cdot 2\pi r}{2} dx \tag{1}$$

A resistance value R(x) from an end of the first linear material 11 to the point x is represented by the following equation (2) wherein ρ represents conductivity of the first linear material 11.

$$R(x) = \frac{\rho \cdot x}{\pi \cdot r^2} \tag{2}$$

An amount of voltage drop V(x) from the point x to the end of the first linear material 11 is represented by the following equation (3).

$$V(x) = i(x) \cdot R(x) = \frac{J_{sc} \cdot 2\pi r}{2} dx \cdot \frac{\rho \cdot x}{\pi \cdot r^2} \quad (3)$$

Based on the equations (1) to (3), the total amount of voltage drop of the first linear material 11 can be represented by the following equation (4).

$$V = \int_0^l \frac{J_{sc} \cdot 2\pi r}{2} \cdot \frac{\rho \cdot x}{\pi \cdot r^2} dx \quad (4)$$
$$= \frac{J_{sc} \cdot \rho}{r} \left[ \frac{x^2}{2} \right]_0^l$$
$$= \frac{J_{sc} \cdot \rho \cdot l^2}{2r}$$

Based on the equations (1) to (4), the generated current density, length of the linear material, wire diameter and conductivity will be controlled such that the total amount of the voltage drop V of the first linear material 11 is 300 mV or less.

For example, for a first linear material 11 having diameter of 200 μm, length of 4 m and generated current density of 10 mA/cm², the conductivity should be 67% or greater. To obtain the conductivity of 67% or greater, the metal coating 11B should be formed on the copper wire 11A such that the surface ratio of the copper of the first linear material 11 is 65% or greater with respect to the metal coating 11B.

As described above, the surface ratio of the copper and the metal coating 11B may suitably be controlled such that the amount of the voltage drop is 300 mV or less according to the length and the wire diameter of the first linear material 11.

Next, an exemplary method for fabricating the first linear material 11 will be described. Here, Ti is used as the metal coating 11B. First, a Ti pipe is formed by, for example, extrusion molding or the like. A copper wire is then formed by, for example, extrusion molding or the like. The copper wire is inserted in the Ti pipe while these members are travelling together. The copper wire and the Ti pipe are then squeezed to adhere tightly to each other to provide a Ti-coated copper wire. In this manner, the first linear material 11 (i.e., the Ti-coated copper wire) is obtained.

Next, the Ti-coated copper wire is immersed in a TiO₂ paste, removed and dried to fabricate the first electrode 10 from the first linear material 11. This process is repeated three times before the TiO₂ paste is applied on the surface of the Ti-coated copper wire. Then, TiO₂ fine powder is made to adhere to the surface of the Ti-coated copper wire. The copper wire is then sintered at 500° C. in an electric furnace for 1 hour. In this manner, a Ti-coated copper wire with porous TiO₂ film is obtained. Next, the Ti-coated copper wire with porous TiO₂ film is made to carry sensitizing dye. In this manner, the first electrode 10 is fabricated. Although Ti is used as the metal coating 11B in the above description, Ni, W, Rh and Mo may be used similarly.

The porous oxide semiconductor layer 12 is provided on an outer circumference of the first linear material 11. The porous oxide semiconductor layer 12 carries the sensitizing dye on at least a part of the surface.

Although the porous oxide semiconductor layer 12 may cover only a part of the outer circumference of the first linear material 11, it is preferred that the entire outer circumference of the first linear material 11 is covered to prevent decrease in light collection capability or to prevent promotion of a reverse electron transfer reaction.

Semiconductor materials for the porous oxide semiconductor layer 12 are not particularly limited, and may be any material usually employed for porous oxide semiconductor for photoelectric conversion elements. Examples thereof may include titanium oxide ($TiO_2$), tin oxide ($SnO_2$), zinc oxide (ZnO), niobium oxide ($Nb_2O_5$) and tungsten oxide ($WO_3$).

The porous oxide semiconductor layer 12 may be fabricated in the following manner. First, desired additive(s) is added as necessary to a dispersed solution prepared by dispersing commercially-available oxide semiconductor fine particles in a desired dispersion medium or to a colloidal solution which may be prepared by a sol-gel method. The obtained solution is deposited onto the outer circumference of the first linear material 11 by immersion, application, extrusion or other method. The solution is then sintered to provide a porous oxide semiconductor layer 12 on the outer circumference of the first linear material 11.

The thickness of the porous oxide semiconductor layer 12 is not particularly limited, but may preferably be 1 to 50 μm.

Examples of the sensitizing dye may include a ruthenium complex, such as N3 and black dye, a metal-containing complex, such as porphyrin and phthalocyanine, and an organic dye, such as eosin, rhodamine and merocyanine. Among these, a sensitizing dye which exhibits an excitation behavior suited for the application and suitable for a semiconductor to be used.

The second electrode 20 is linear, and may be configured by such as platinum (Pt), a Pt-coated Ti wire and a Ti compound wire, carbon, a carbon-coated Ti wire and a Ti compound wire or a conductive polymer.

The second electrode 20 may also be a Pt-coated conductive linear substrate which is electrochemically inert to electrolytes, or a linear substrate coated with carbon or a conductive polymer. Such a second electrode 20 may facilitate prompt-transfer of the electric charge with the electrolyte.

Exemplary linear substrates may include inert metals, such as Ti, Ni, W, Rh and Mo, or carbon fiber.

The second electrode 20 may be a plate material. In this case, the first electrode 10 may be wound via a separator on the periphery of the plate shaped second electrode 20 to provide a photoelectric conversion element (see FIG. 10). The first electrode 10 includes a sensitizing dye-carrying porous oxide semiconductor layer. The separator may be a network nylon fiber or the like.

Examples of the carbon may include graphited (i.e., crystallized) carbon, amorphous carbon, fullerene, carbon nanotube and carbon fiber. Alternatively, particles, such as carbon black, may be pasted and applied to the linear substrate or the Ti wire. Such carbon may preferably be heated or sintered to remove unnecessary adhesions for smooth electrode reaction of iodine redox couples.

Examples of conductive polymers which constitute the second electrode 20 may include a poly (3,4-ethylenedioxythiophene) (PEDOT) derivative and a polyaniline (PANI) derivative.

If both of the first and second electrodes 10 and 20 are linear members as in the present embodiment, the second electrode 20 may preferably have a diameter of one fourth or less of that of the first electrode 10. Thus, a plurality of first electrodes 10 may be arranged closely adjacent to each other and the second electrodes 20 may be placed between the first electrodes 10.

Since excessively narrow second electrodes 20, however, may increase resistance, it is preferred that the second electrode 20 be as thick as possible. It is therefore preferred that the diameter of the second electrode 20 is about one fourth of that of the first electrode 10.

As shown in FIG. 4, it is preferred that the first linear materials 11 are drawn out of the device so that the generated electricity may easily be taken out.

The electrolyte 17 may be fabricated by impregnating the porous oxide semiconductor layer 12 with an electrolyte solution, which electrolyte solution may optionally be gelled (i.e., pseudo-solidified) using a suitable gelling agent to be integrated with the porous oxide semiconductor layer 12. The electrolyte 17 may be based on an ionic liquid. Alternatively, the electrolyte 17 may be a gel electrolyte containing oxide semiconductor particles and conductive particles.

The electrolyte may be obtained by dissolving electrolyte components, such as iodine, iodide ion, and tertiary butyl pyridine, in ionic liquids or organic solvents, such as ethylene carbonate and methoxyacetonitrile.

The gelling agent for the electrolyte may be polyvinylidene fluoride, a polyethylene oxide derivative and an amino acid derivative.

Alternative to the volatile electrolyte solution, an ionic liquid solvent, a gelled solvent, or solid electrolytes such as a p-type inorganic semiconductor and an organic hole transport layer, which are generally used in dye-sensitized solar cells, may also be employed in the invention.

Examples of the ionic liquid may include, but not limited to, an ambient temperature molten salt including a compound having quaternized nitrogen atoms as a cation. The salt is liquid at room temperature.

Examples of the cation of the ambient temperature molten salt may include a quaternized imidazolium derivative, a quaternized pyridinium derivative and a quaternized ammonium derivative.

Examples of an anion of the ambient temperature molten salt may include $BF_4^-$, $PF_6^-$, $(HF)_n^-$, bis(trifluoromethanesulfonyl)imide ($N(CF_3SO_2)_2^-$) and an iodine ion.

Examples of the ionic liquid may include salts comprising of a quaternized imidazolium-based cation, an iodide ion or a bis(trifluoromethylsulfonyl)imide ion.

The oxide semiconductor particles are not particularly limited in substance or particle diameter, but may be compatible with electrolytes comprising mainly of an ionic liquid and may be capable of gelling the electrolytes. The oxide semiconductor particles should not impair semi-conductivity of the electrolytes and should have excellent chemical stability over co-existing components in the electrolyte. Especially if the electrolyte includes an oxidation-reduction couple, such as iodine and iodide ion, or bromine and bromide ion, the oxide semiconductor particles should preferably not cause degradation through oxidation reaction.

Preferred examples of the oxide semiconductor particles may be selected from a group consisting of $TiO_2$, $SnO_2$, $SiO_2$, $ZnO$, $Nb_2O_5$, $In_2O_3$, $ZrO_2$, $Al_2O_3$, $WO_3$, $SrTiO_3$, $Ta_2O_5$, $La_2O_3$, $Y_2O_3$, $Ho_2O_3$, $Bi_2O_3$ and $CeO_2$ and mixtures thereof. An average particle diameter of the oxide semiconductor particles is preferably about 2 to 1000 nm.

The conductive particles may be used a particle having a conductivity or semi-conductivity. The conductive particles are not particularly limited in substance or particle diameter, but may be compatible with electrolytes comprising mainly of an ionic liquid and may be capable of gelling the electrolytes. The conductive particles should have excellent chemical stability over co-existing components in the electrolyte. Especially if the electrolyte includes an oxidation-reduction couple, such as iodine and iodide ion, or bromine and bromide ion, the conductive particles should preferably not cause degradation through oxidation reaction.

The conductive particles may be carbon-based, and examples thereof may include a carbon nanotube, carbon fiber and carbon black, all of which may be prepared in known processes or may be commercially available.

The transparent substrate 18 may be a light-transmitting substrate generally employed as a transparent substrate of a photoelectric conversion element. Examples thereof may include a non-alkali glass substrate, other glass substrates and a resin substrate, such as glass, polyethylene terephthalate, polycarbonate and polyether sulphone. The transparent substrate 18 may suitably be selected in consideration of, for example, resistance property to the electrolyte. It is preferred that the light-transmittance of the transparent substrate 18 be as high as possible. The transparent substrate 18 may preferably have light-transmittance of 85% or greater.

Examples of the spacer 19 is not particularly limited so long as they have sufficient adhesiveness to the transparent substrate 18 and may preferably be an adhesive comprising of thermoplastic resin which has a carboxylic acid group in a molecular chain. Namely, HIMILAN (registered trade name) generated by DuPont-Mitsui Polychemicals Co., Ltd., Bynel (registered trade name) by DuPont and UV-curing material, such as 31X-101 by ThreeBond Co., Ltd.

The photoelectric conversion element 1 of the present embodiment has a completely novel structure in which no conductive substrate is necessary.

In the photoelectric conversion element 1, a metal wire (i.e., the first linear material 11) of great corrosion resistance may have conductivity and the transparent substrate 18 having no conductivity is used to seal the electrolyte 17. With this configuration, since no glass substrate or transparent conductive film is used as in the related art electrodes, the electrodes (i.e., the first and second electrodes) may be fabricated at low cost. In addition, the central metal of the first linear material 11 is a copper wire of great corrosion resistance, high conductivity and lower cost. The central metal is coated with Ti or other substance to provide a metal compound wire (i.e., the first linear material) of greater corrosion resistance, high conductivity and low cost.

Since the outer circumferential surface of the linear first electrode 10 serves as a light-receiving surface (for example, see FIG. 4), a project area to the incoming light may be increased and thus dependence to the light incidence angle may be decreased.

The photoelectric conversion element 1 of the present embodiment includes the linear second electrodes 20 which are disposed between the first electrodes 10. With this configuration, the first and second electrodes 10 and 20 are arranged more effectively in the photoelectric conversion element 1, thereby providing a further thinner photoelectric conversion element.

According to the photoelectric conversion element 1 of the present embodiment, since the distance between the glass plate (i.e., the transparent substrate) through which light is introduced and the surface of the electric power generator (i.e., the porous oxide semiconductor layer) may be small, thereby improving electricity generating capacity.

<Second Embodiment>

Figure 5:
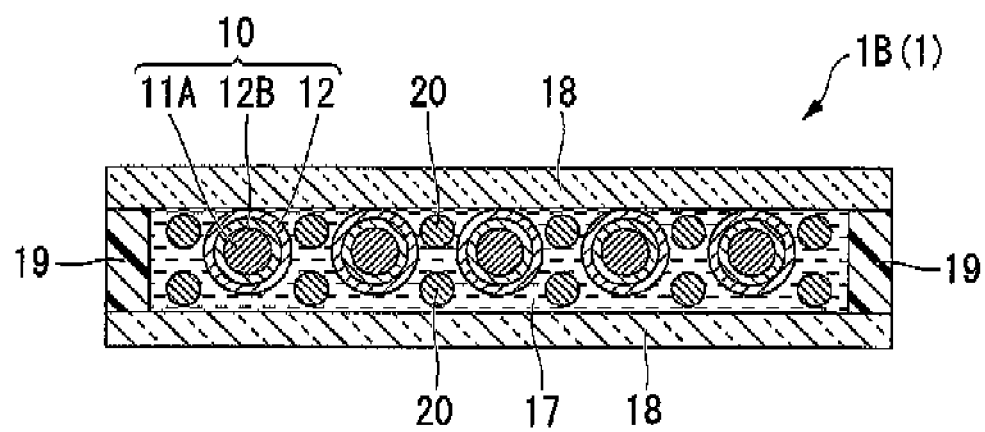
FIG. 5 is a cross-sectional view of a photoelectric conversion element according to another embodiment of the invention.

Referring now to FIG. 5, a photoelectric conversion element 1 according to a second embodiment of the invention will be described.

FIG. 5 illustrates a photoelectric conversion element 1B (1) according to the present embodiment shown in a cross-sectional view. In the present embodiment, components different from those of the first embodiment will be described and description of common components will be omitted.

The photoelectric conversion element 1B (1) is almost the same as the photoelectric conversion element of the first embodiment except that the second electrodes 20 are disposed above and below the first electrodes 10 (i.e., disposed on the pair of transparent substrates 18).

With this configuration, since the second electrodes 20 are disposed above and below the first electrodes 10, the first and second electrodes 10 and 20 are disposed more close to each other so as to improve photoelectric conversion efficiency. If an increased number of the second electrodes 20 functioning as counter electrodes is provided, the photoelectric conversion efficiency is hardly impaired with respect to the light incident vertically.

<Third Embodiment>

Figure 6:
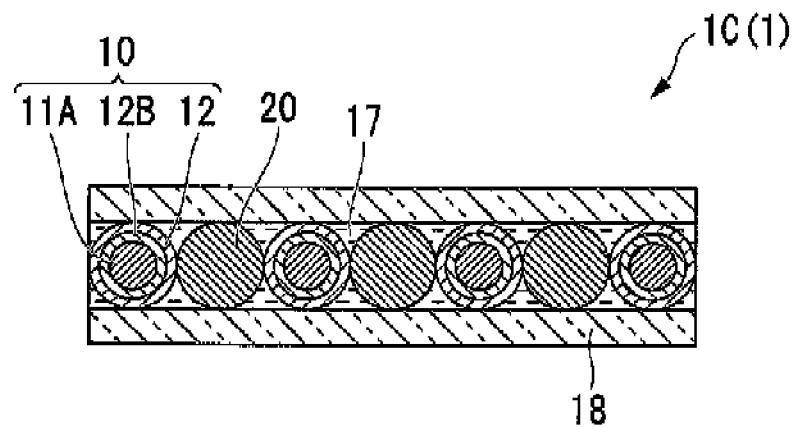
FIG. 6 is a cross-sectional view of a photoelectric conversion element according to a further embodiment of the invention.
Figure 7:
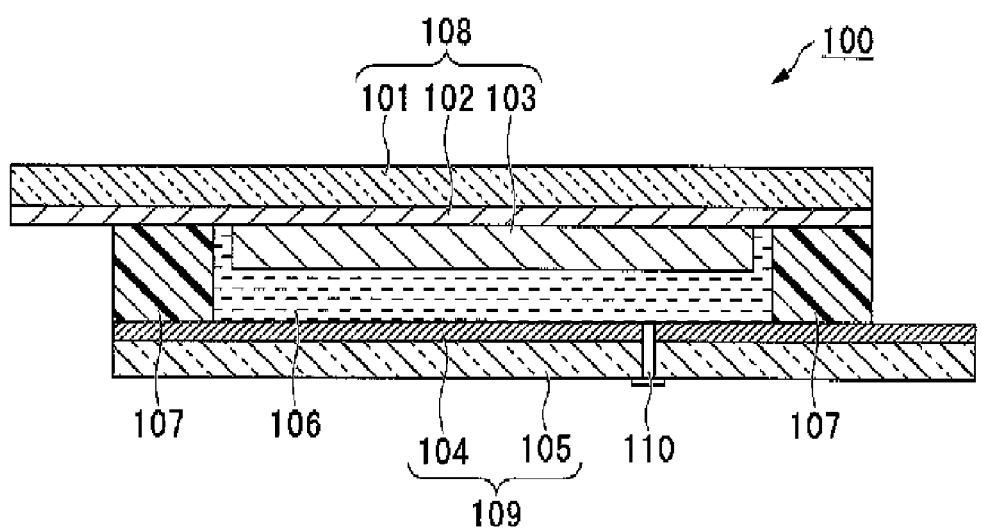
FIG. 7 is a cross-sectional view of an exemplary related art photoelectric conversion element.

Referring now to FIG. 6, a photoelectric conversion element 1 according to a third embodiment of the invention will be described.

FIG. 6 illustrates a photoelectric conversion element 1C (1) according to the present embodiment shown in a cross-sectional view. In the present embodiment, components different from those of the first embodiment will be described and description of common components will be omitted.

The photoelectric conversion element 1C (1) is almost the same as the photoelectric conversion element of the first embodiment except that the second electrodes 20 having substantially the same diameter as those of the first electrodes 10 are disposed alternately at both sides of the first electrodes 10.

As shown in this embodiment, since the second electrodes 20 having substantially the same diameter as those of the first electrodes 10 are disposed alternately at both sides of the first electrodes 10, the obtained photoelectric conversion element 1C becomes linear, and thus may easily be placed at various positions.

Figure 8A:
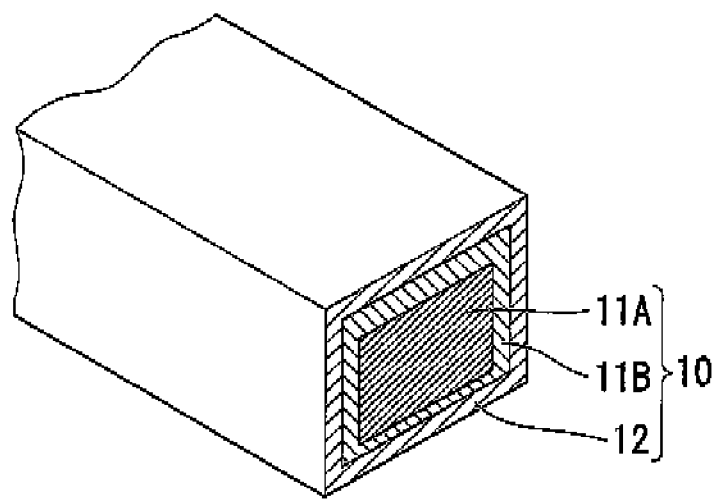
FIG. 8A is a cross-sectional perspective view of an electrode (i.e., a first electrode) incorporated in a photoelectric conversion element according to a modified embodiment of the invention.
Figure 8B:
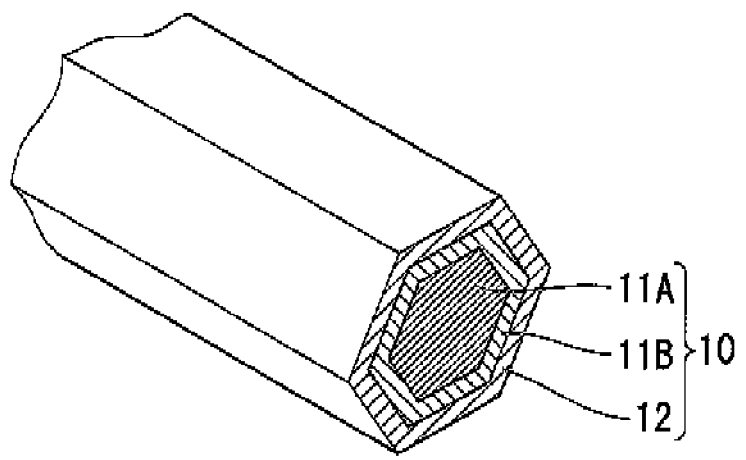
FIG. 8B is a cross-sectional perspective view of an electrode (i.e., a first electrode) incorporated in a photoelectric conversion element according to a further embodiment of the invention.

The first electrodes 10 and the second electrodes (not shown) may be of different configurations, such as flat wire, triangular, or other poly line configurations as shown in FIGS. 8A and 8B.

EXAMPLES

The following Examples are given for illustrative purpose only and the scope of the invention is not limited to the same.

Example 1

First, a Ti-coated copper wire (first linear material) of 1.0 mm in diameter is fabricated in the method described above. The Ti-coated copper wire is immersed in a $TiO_2$ paste (Ti Nanoxide-T by Solaronix), removed and then dried. This process is repeated three times before the $TiO_2$ paste is applied on the surface of the Ti-coated copper wire. The Ti-coated copper wire is then sintered at 500° C. in an electric furnace for 1 hour. In this manner, a Ti-coated copper wire with $TiO_2$ film is obtained. $TiO_2$ is applied over the length of 5 cm and to the thickness of about 6 μm.

Next, to a mixed solution of acetonitrile and tert-butanol mixed in proportion of 1:1, ruthenium dye (Ruthenium 535-BisTBA by Solaronix, generally referred to as N719) is dissolved to obtain a 0.3 mM ruthenium dye solution. The Ti wire coated with $TiO_2$ described above is then immersed in this ruthenium dye solution for 24 hours at room temperature to make the $TiO_2$ surface carry the ruthenium dye. Subsequently, the Ti wire coated with $TiO_2$ is removed from the ruthenium dye solution, and washed in the mixed solution described above to obtain a working electrode (i.e., the first electrode). Five working electrodes are fabricated in the same process.

Six Pt wires of 0.08 mm in diameter are prepared as counter electrodes. These six counter electrodes and five working electrodes are alternately arranged on a non-alkali glass substrate. Subsequently, 1.0-mm-thick PET film is disposed at a periphery of the non-alkali glass substrate as a spacer. These electrodes and the spacer are immersed in a volatile electrolyte having methoxyacetonitrile as a solvent. A piece of non-alkali glass is placed on the upper surface of the substrate via the spacer to provide the photoelectric conversion element of Example 1, which is shown in FIG. 3.

In the present embodiment, since the metal wires (i.e., the working electrodes and the counter electrodes) are arranged under no particular control. The light-receiving surface area of the cell is about 5 cm×0.15 cm=about 0.75 $cm^2$ including gaps between wires. Since the light-receiving surface area (i.e., an active area) of the working electrode corresponds to a project area of the dye-carrying Ti wire coated with $TiO_2$, the light-receiving surface area may be 5 cm×0.0212 cm×5=0.53 $cm^2$, with a 1.5-fold range of error in estimation of the short circuit current density.

The thus-fabricated photoelectric conversion element of Example 1 is irradiated with light using a solar simulator (AM1.5, 100 mW/$cm^2$) and a current-potential curve is obtained. The result is shown in FIG. 9.

Figure 9:
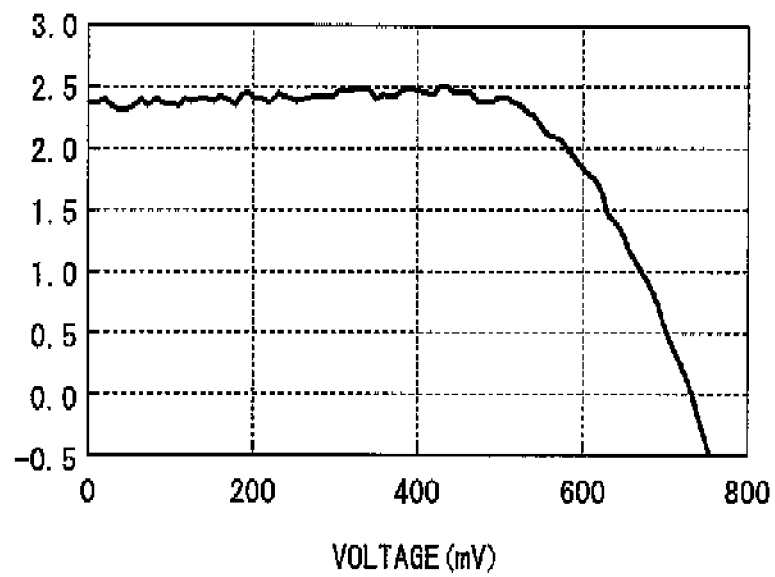
FIG. 9 is a current-potential curve showing a result of measurement in a photoelectric conversion element of Example 1.

FIG. 9 shows that Jsc=2.4 mA/$cm^2$, Voc=730 mV and ff=0.71, and the photoelectric conversion efficiency is 1.25%.

Example 2

An 8 m-long Ti-coated copper wire (i.e., the first linear material) stretched to a wire diameter of 0.2 mm is prepared. A surface ratio of the copper to titanium is set to 40% (i.e., a surface ratio of titanium is set to 60%). The Ti-coated copper wire is immersed in a $TiO_2$ paste (Ti Nanoxide-T by Solaronix), removed and then dried. This process is repeated three times before the $TiO_2$ paste is applied on the surface of the Ti-coated copper wire. The Ti-coated copper wire is then sintered at 500° C. in an electric furnace for 1 hour. In this manner, a Ti-coated copper wire with porous $TiO_2$ film is obtained. $TiO_2$ is applied to the thickness of about 6 μm.

Next, to a mixed solution of acetonitrile and tert-butanol mixed in proportion of 1:1, ruthenium dye (Ruthenium 535-BisTBA by Solaronix) is dissolved to obtain a 0.3 mM ruthenium dye solution. The Ti wire coated with $TiO_2$ described above is then immersed in this ruthenium dye solution for 24 hours at room temperature to make the $TiO_2$ surface carry the ruthenium dye. Subsequently, the Ti wire coated with $TiO_2$ is removed from the ruthenium dye solution, and washed in the mixed solution described above to obtain a working electrode (i.e., the first electrode).

Figure 10:
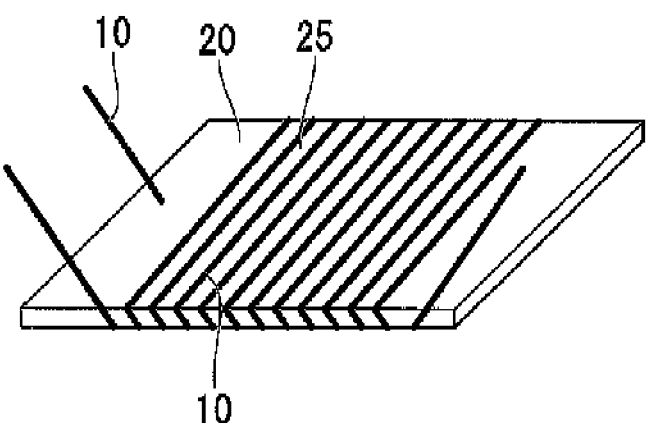
FIG. 10 schematically illustrates photoelectric conversion elements of Example 2 and Example 3.

As a counter electrode (i.e., the second electrode), a Ti plate of 10 cm×10 cm (1 mm in thickness) is prepared and 200 nm-thick platinum is sputtered on its surface. The first electrode is wound onto the second electrode as shown in FIG. 10. If the first electrode and the second electrode are brought into direct contact, they will be shorted and thus no more function as a photoelectric conversion element. To prevent this phenomenon, a 16-micrometer-thick network nylon fiber is provided on periphery of the second electrode so that the first electrode is wound onto the second electrode via the nylon fiber.

Next, the first electrode and the second electrode are immersed in a volatile electrolyte (i.e., an electrolyte solution) having methoxyacetonitrile as a solvent to provide a photoelectric conversion element of Example 2. A container for the electrolyte solution is not particularly limited so long as it is transparent and suited to hold the electrolyte solution. For example, a box shaped container may be fabricated using a combination of polyethylenenaphthalate and glass.

In the present embodiment, since the generated current is collected from both ends of the wound first electrode, the length of the first electrode suffering from voltage drop may be considered to be the half of the full length. In particular, an amount of voltage drop V may be calculated as to the half of the full length of 8 m (i.e., 4 m). The generated current density of 10 mA/cm² is considered in calculation of the amount of voltage drop.

The thus-fabricated photoelectric conversion element of Example 2 is irradiated with light using a solar simulator (AM1.5, 100 mW/cm²) and a current-potential curve is obtained. The result is shown in Table 2. Table 2 also shows the amount of voltage drop of the example 2 obtained by the equation (4).

Example 3

A Ti-coated copper wire (i.e., the first linear material) is fabricated in the same manner as in Example 2 except that the surface ratio of copper to titanium is set to 80% (i.e., the surface ratio of titanium is set to 20%) to fabricate a photoelectric conversion element of Example 3.

The thus-fabricated photoelectric conversion element of Example 3 is irradiated with light using a solar simulator and a current-potential curve is obtained in the same manner as in the example 2. The result is shown in Table 2. Table 2 also shows the amount of voltage drop of the example 3 obtained by the equation (4).

Comparative Example

A photoelectric conversion element is fabricated in the same manner as in Example 2 except that a pure titanium wire is used in place of the Ti-coated copper wire (i.e., the first linear material) to fabricate a photoelectric conversion element of Comparative Example 1. The thus-fabricated photoelectric conversion element of Comparative Example 1 is irradiated with light using a solar simulator and a current-potential curve is obtained in the same manner as in the example 2. The result is shown in Table 2. Table 2 also shows the amount of voltage drop of the Comparative Example obtained by the equation (4).

TABLE 2

| | Surface ratio of copper (%) | Conversion efficiency (%) | Jsc (mA/cm²) | Voc (mV) | FF | Amount of voltage drop (mV) |
| --- | --- | --- | --- | --- | --- | --- |
| Example 2 | 40 | 1.9 | 5.2 | 705 | 0.45 | 318 |
| Example 3 | 80 | 4.1 | 10.1 | 720 | 0.72 | 148 |
| Comparative Example 1 | 0 | 0.5 | 0.5 | 680 | 0.21 | 4000 |

From the result of the solar simulation shown in Table 2 and Example 1, it is confirmed that the photoelectric conversion efficiency improves when the first linear material (i.e., the Ti-coated copper wire) coated with metal (i.e., titanium) is employed in place of a pure titanium wire. From result of Examples 2 and 3, when the surface ratio of the metal coating (i.e., titanium) is reduced (i.e., the surface ratio of the copper wire is increased) and the amount of voltage drop is set to 300 mV or less, the photoelectric conversion efficiency may be improved. As a result, a high-performance photoelectric conversion element is provided.

DESCRIPTION OF THE REFERENCE SYMBOLS 1 (1A, 1B, 1C) photoelectric conversion element
10 First electrode
11 First linear material
11A Copper wire
11B Metal coating
12 Porous oxide semiconductor layer
20 Second electrode
17 Electrolyte
18 Transparent substrate
19 Spacer

What is claimed is:
1. A photoelectric conversion element comprising:
a plurality of first electrodes, each of the plurality of first electrodes being linear, each of the first electrodes comprising a first linear material including a copper wire and a metal coating which coats the copper wire, each of the first electrodes comprising a dye-carrying porous oxide semiconductor layer being disposed on an outer circumference of the first linear material;
a plurality of linear second electrodes, each of the second electrodes being disposed between two of the plurality of first electrodes;
and an electrolyte with which each of the first electrodes and each of the second electrodes are in contact,
wherein the metal coating comprises metal which is selected from the group consisting of titanium, nickel, tungsten, rhodium and molybdenum,
the metal coating is formed on the copper wire such that a surface ratio of the copper wire is 65 to 80% with respect to the metal coating so that an amount of voltage drop is 300 mV or less,
a thickness of the metal coating is 2 to 3 μm, and
each of the second electrodes having a diameter of one-fourth or less of a diameter of one of the two of the plurality of first electrodes.
2. The photoelectric conversion element according to claim 1, wherein each of the first electrodes has a cross-section which is round, and each of the second electrodes has a cross-section which is round.

* * * * *